United States Patent [19]

Orphan

[11] Patent Number: 5,424,785
[45] Date of Patent: Jun. 13, 1995

[54] SYSTEM FOR ENCODING AND DISPLAYING CAPTIONS FOR TELEVISION PROGRAMS

[75] Inventor: David W. Orphan, Vienna, Va.

[73] Assignee: National Captioning Institute, Vienna, Va.

[21] Appl. No.: 215,567

[22] Filed: Mar. 22, 1994

[51] Int. Cl.⁶ .................. H04N 5/222; H04N 7/087
[52] U.S. Cl. .................. 348/722; 348/461; 348/478; 348/552; 345/116
[58] Field of Search ............ 348/722, 844, 460, 461, 348/478, 476, 473, 552, 1, 9, 8, 474, 468, 467, 465, 469, 605, 705, 4, 589, 600, 510, 512; H04N 7/087, 7/08, 5/222; 345/115, 116; 395/154; 358/311; 360/14.1–14.3

[56] References Cited

U.S. PATENT DOCUMENTS

| | | | |
|---|---|---|---|
| 4,161,728 | 6/1979 | Insam | 340/750 |
| 4,288,809 | 9/1981 | Yabe | 358/12 |
| 4,344,090 | 8/1982 | Belisome et al. | 358/183 |
| 4,425,581 | 1/1984 | Schweppe et al. | 348/589 |
| 4,611,227 | 9/1986 | Brockhurst et al. | 358/147 |
| 4,675,737 | 6/1987 | Fujino et al. | 348/589 |
| 4,724,491 | 2/1988 | Lambert | 358/310 |
| 4,725,886 | 2/1988 | Galumbeck et al. | 348/461 |
| 4,751,578 | 6/1988 | Reiter et al. | 358/183 |
| 4,814,883 | 3/1989 | Perine et al. | 358/181 |
| 4,888,638 | 12/1989 | Bohn | 358/84 |
| 4,890,319 | 12/1989 | Seth-Smith et al. | 380/14 |
| 4,974,085 | 11/1990 | Campbell et al. | 358/181 |
| 5,008,750 | 4/1991 | Gomikawa | 358/147 |
| 5,048,072 | 9/1991 | Yasuda | 379/53 |
| 5,055,924 | 10/1991 | Skutta | 358/84 |
| 5,097,349 | 3/1992 | Nomura et al. | 358/335 |
| 5,200,825 | 4/1993 | Perine | 358/181 |
| 5,208,671 | 5/1993 | Tarrant | 358/147 |
| 5,294,982 | 3/1994 | Salomon et al. | 348/461 |

*Primary Examiner*—James J. Groody
*Assistant Examiner*—Safet Metjahic
*Attorney, Agent, or Firm*—Banner, Birch, McKie & Beckett

[57] ABSTRACT

A system for encoding, storing, and displaying captions includes a modem for transmitting a signal including one or more closed captions generated in real time, a videotape player for playing a videotape of a television program including both a video signal and a time code signal corresponding to a time position of the video tape, an encoder for receiving the video signal and a caption input and integrating the video signal and the caption input into one integrated signal for transmission, and a computer that receives captions from the modem and a time code output from the video tape player. The computer transmits the received captions to an encoder and simultaneously generates data records storing the received captions with a time code stamp corresponding to the time code signal input when the caption was received. When a playback of the captioned television program is desired, the computer retrieves the stored caption data record and synchronizes the time code stamp of each caption in the data record with the received time code output. Thus, the computer supplies the synchronized caption to the encoder for insertion into the video signal from the videotape player, whereby captions are provided for refeeds of television programs without requiring a second generation recording of the originally captioned feed.

9 Claims, 5 Drawing Sheets

SYSTEM FOR ENCODING AND DISPLAYING CAPTIONS FOR TELEVISION PROGRAMS

FIELD OF THE INVENTION

The present invention relates to a system for providing captions for television programs including encoding, storage and retrieval of captions created for a television program. The system of the present invention provides captions for both original and later broadcasts of the television program.

BACKGROUND OF THE INVENTION

In order to permit people with impaired hearing to watch television programs, it is well known to provide closed captions for television programs wherein the spoken dialogue of the television program is superimposed on the video image, similarly to film subtitles. Closed captions are provided for "live" television programs that appear on a daily basis as well as for programs which have been previously recorded. The captions for "live" programs are often created at the time the program is broadcasted, requiring a system by which captions can be inserted into the video signal of a program that is currently being broadcasted.

Under currently practiced technology, captions for many television programs are created in the following way. The live broadcast of a program is viewed by stenographers who type the dialogue from the program into a receiving computer, creating the caption data for the program, for example, in the form of ASCII code. The caption data are then transmitted by a modem from the receiving computer to an encoder. The video signal of the broadcast is also input into the encoder. Upon receiving the video signal and the transmitted caption data, the encoder inserts the caption data into the vertical blanking interval of the video signal. Then the encoder transmits the integrated signal (the video signal plus the caption data) to viewers' home receivers. The receivers then decode the caption data and display the video signal of the program such that the captions appear on the television screen superimposed on the video image.

A method of creating caption data, translating the caption data into a caption signal for insertion into a video signal, and inserting the caption signal into the video signal is described in FIGS. 2A, 2B, and 2C and the description related thereto in U.S. Pat. No. 5,294,982, incorporated herein by reference.

One known organization providing captioning equipment and services is The National Captioning Institute of Falls Church, Va. (hereinafter, NCI). NCI provides caption decoders, such as the Telecaption 4000 decoder, to viewers of television programs who have impaired heating. Moreover, at its Falls Church, Va. and West Coast locations, NCI provides services and equipment for broadcasters for captioning pre-recorded and live broadcasts.

However, due to the number of time zones in the U.S., television programs are frequently broadcasted more than once in a day so that the programs air at a certain time in each of the time zones. For example, if a program is to air at eight o'clock in the evening across the country, the program must be aired four times, once in each time zone. Therefore, in order to provide captioning for these later broadcasts or refeeds of the program, either the captioning process is substantially duplicated or a second generation recording is made of the first broadcast including the inserted captions. This captioning procedure requires a significant amount of operator intervention to accomplish the captioning of the refeeds.

There are a number of known systems for displaying and storing alphanumeric-type dam, such as captions. For example, U.S. Pat. No. 5,097,349 to Nomura et at. discloses a system for storing various types of information including captions with video data onto compact discs. Instruction codes are interleaved with the video data and are used during playback to determine when and how to display the stored information such as captions with the video signal. In another example, U.S. Pat. No. 4,751,578 to Reiter et at., a system is disclosed for processing and displaying closed captions. The caption data is sent in the vertical blanking interval of the program signal and then processed by an RF section and a mixer to place the captioning in a comer box of the video screen format. The mixed signal is then sent to the television for display. However, these systems do not address the specific problems of providing closed captions discussed above.

OBJECTS OF THE INVENTION

Therefore, it is an object of the present invention to provide a system that supplies closed captions on refeeds of television programs without requiring a substantial duplication of the captioning process and without requiring a second generation recording of the original captioned feed.

It is a further object of the present invention to provide a system requiring minimal operator intervention at the television broadcast origination site to accomplish captioning of the refeed broadcasts.

It is an additional object of the present invention to provide a system allowing easy storage and retrieval of caption data files so that repeat broadcasts may be easily captioned.

Various other objects, advantages and features of the present invention will become readily apparent from the following detailed description.

SUMMARY OF THE INVENTION

According to the system of the present invention, during a first feed (original broadcast) of a live program, caption data, for example, in ASCII or any other well-known format, created by the stenographers is transmitted via modem to a central computer which transmits the caption data directly to an encoder for insertion into a video signal as in the currently known system. In addition, the central computer concurrently stores the caption data into a file which can be retrieved as desired at a later time. The central computer also receives a time code signal from the master playback unit transmitting the video signal of the program. Using this time code signal, the central computer provides a time code stamp for the caption data being stored. As a result, when caption data is stored o into a file, it is stored with a time stamp which provides information describing the portion of the video signal to which the caption data corresponds.

When a refeed (a later broadcast) of the program is desired, the central computer retrieves the stored caption data file for the program and reads the time code stamps stored with the caption data in the file. When the computer detects a match between the time code stamps accompanying the caption data and the time code output from the master video player, it transmits the caption data to the encoder. The encoder then inserts the received caption data into the video signal at the appropriate time and transmits the integrated signal.

The system of the present invention includes a modem for transmitting caption data over a telephone line, the caption data including one or more captions generated in real time; a videotape player for playing a videotape, the videotape player having a video output for producing a video signal and a time code output for producing a time code signal corresponding to a time position of the video tape; an encoder for receiving the video signal and a caption input and integrating the video signal and the caption input into one integrated signal for transmission; and a computer coupled to the telephone line over which the modem transmits and coupled to the time code output of the videotape player. The computer includes means for receiving the caption data transmitted by the modem, means for receiving the time code signal from the videotape player, means for generating data records comprising the received caption data and a time stamp corresponding to the received time code signal, means for storing the generated data records to a disk file, means for transmitting the received caption data, and means for retrieving the data records stored to the disk file, matching the time stamp of each data record in the disk file with the received time code signal, and transmitting the caption data corresponding to the matched time stamp. The system also includes an encoder having a video input for receiving the video signal from the videotape player and a caption input for receiving caption dam transmitted by the computer, wherein the encoder integrates the received video signal and the received caption data to produce an integrated television signal and transmits the integrated signal.

The method of providing captions for a television signal includes the steps of: broadcasting a television program from a master videotape; generating caption data concurrently with the television program broadcast; transmitting the generated caption data over a telephone line to a remote computer; receiving the transmitted caption data at the remote computer; providing the received caption data to an encoder for integrating the caption data into a video signal from the master videotape and transmitting the integrated signal; time stamping the received caption data with a time code corresponding to a time position of the master videotape; storing the time-stamped caption data to a file on the remote computer; retrieving the stored time-stamped caption data from the file during a subsequent broadcast of the television program; synchronizing the retrieved time-stamped caption data with time codes read from the master videotape; and providing the synchronized caption data to the encoder for integrating the synchronized caption data into the video signal from the master videotape and transmitting the integrated signal.

The system for providing captions for a television program in accordance with the present invention will now be described with reference to the accompanying drawings.

DETAILED DESCRIPTION OF THE PREFERRED EMBODIMENTS

Figure 1:
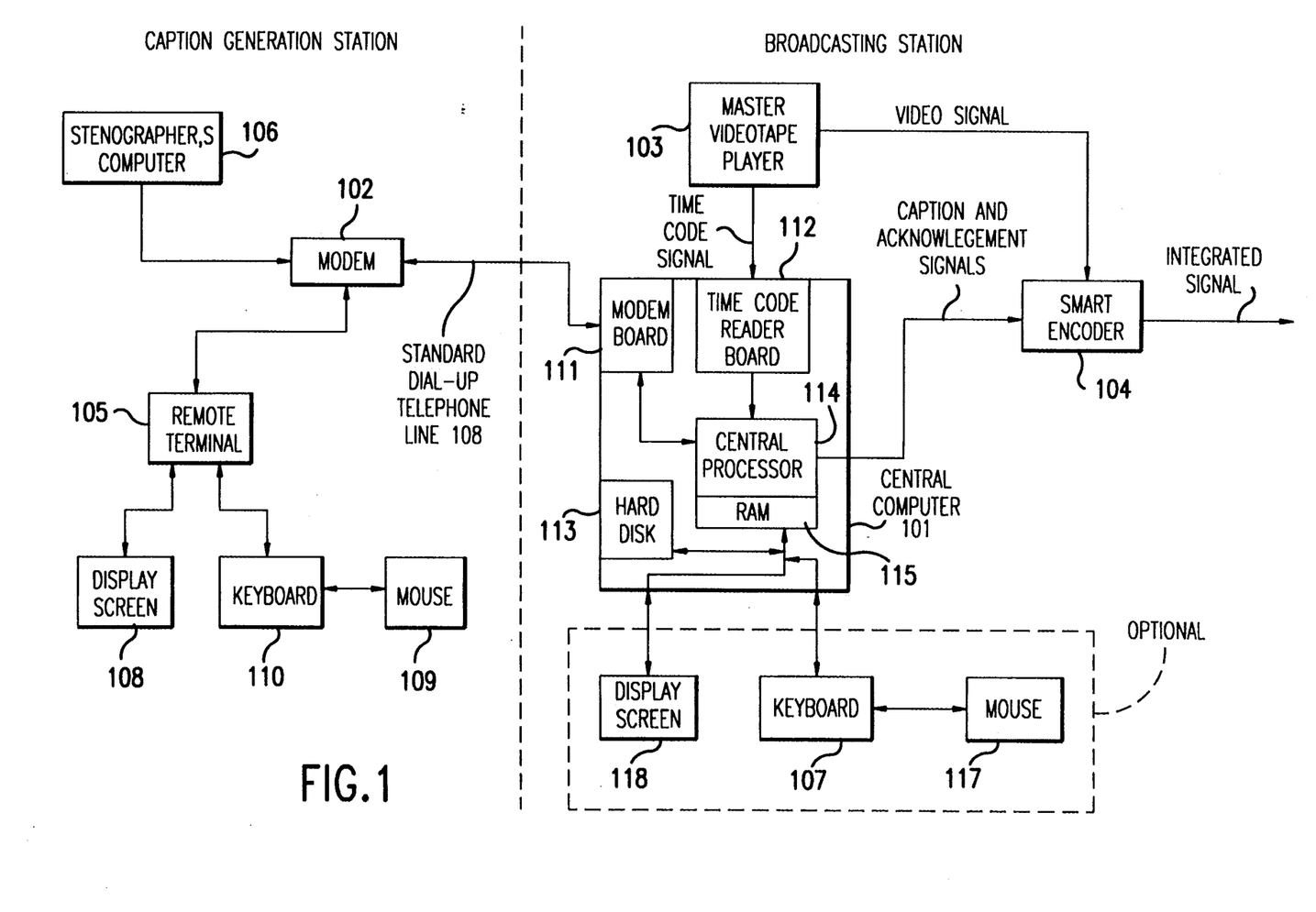
FIG. 1 provides a block schematic diagram of the system for encoding and displaying captions according to the present invention, including a central computer coupled to a modem, a master videotape player and encoder.

Referring now to the drawings, FIG. 1 provides a diagram of the system of the present invention. The system includes a central computer 101, a modem 102, a master videotape player 103, and a smart encoder 104. The central computer 101, the master videotape player 103, and the smart encoder 104 may be located at a broadcasting station which is remote from the caption generation station.

Further, a remote terminal 105 and a stenographer's computer 106 are coupled to the modem 102. A display screen 108, a keyboard 110, and a mouse 110 are attached to the remote terminal 105 to allow for interaction between the remote terminal 105 and an operator. A keyboard 107, display screen 118, and optional mouse 117 are also attached to the central computer 101 to allow for interaction between the central computer 101 and an operator.

During the broadcasting of a "live" television program, the master videotape player 103 plays the master videotape of the program, transmitting the video signal to the smart encoder 104 and also transmitting a time code signal sent in a pre-arranged form, such as a VITC time code or a longitudinal time code, to the central computer 101.

The central computer 101 contains a modem board 111, a time code reader board 112, a hard disk 113, and a central processor 114 with a random access memory 115.

The modem board 111 is coupled to a standard dial-up telephone line 108 and to central processor 114. The modem board receives caption data and control commands for the system entered at remote terminal 105 or stenographer's computer 106 and transmitted by modem 102. The modem board 111 then sends the received caption data and control commands to central processor 114.

The time code reader board 112 of central computer 101 is coupled to the time code signal output of the master videotape player 103 and to central processor 114. The time code reader board receives time code signals input from the master videotape player 103 and sends them to central processor 114.

The hard disk 113 of the central computer 101 is a permanent addressable memory coupled to central processor 114. The hard disk 113 stores the caption data files created by the central processor 114.

The random access memory (RAM) 115 of central computer 101 is the memory used during operation of the caption encoding and displaying system. RAM 115 is contained within the central processor 114. However, additional RAM external to the central processor 114 can also be installed into the central computer 101 as needed.

The operation of the system of the present invention may be briefly described as follows. According to the system of the present invention, during a first feed (original broadcast) of a live program, caption data created by stenographers is transmitted via modem 102 to central computer 101 which transmits the caption data directly to smart encoder 104 for insertion into a video signal as in the currently known system. In addition, the central computer 101 concurrently stores the caption data into a file which can be retrieved as desired at a later time. The central computer 101 also receives a time code signal from the master videotape player 103 transmitting the video signal of the program. Using this time code signal, the central computer 101 provides a time code stamp for the caption data being stored. As a result, when caption data is stored into a file, it is stored with a time stamp which provides information describing the portion of the video signal to which the caption data corresponds. The file is stored on hard disk 113.

When a refeed (a later broadcast) of the program is desired, the central computer 101 retrieves the stored caption data file for the program from hard disk 113 and reads the time code stamps stored with the caption data in the file. When the central computer 101 detects a match between the time code stamps accompanying the caption data and the time code output from the master videotape player 103, it transmits the caption data to the smart encoder 104. The smart encoder 104 then inserts the received caption data into the video signal at the appropriate time and transmits the integrated signal.

Figure 2:
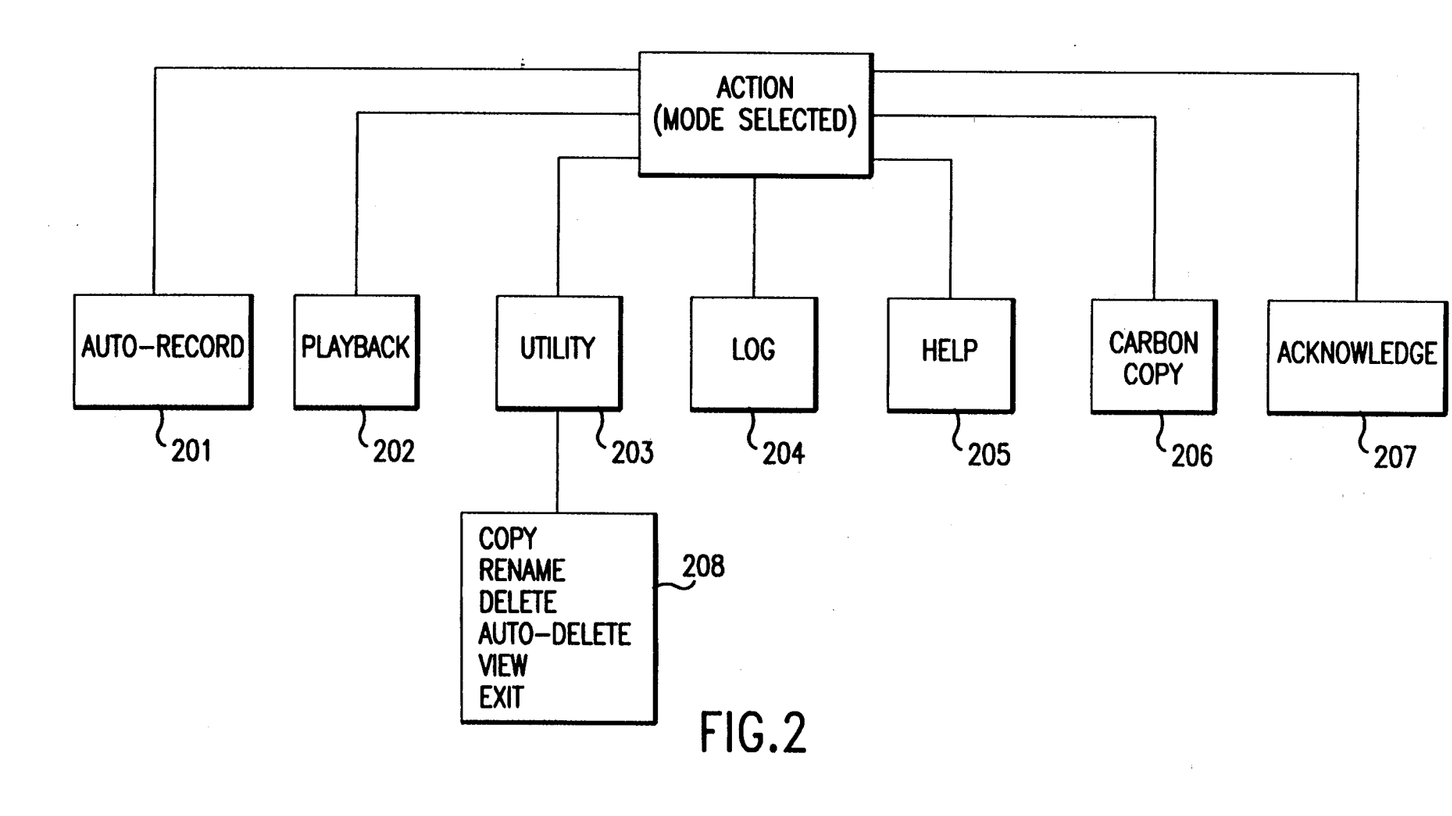
FIG. 2 provides a block diagram of the modes of operation of the central processor of the central computer shown in FIG. 1.

The central processor 114 of central computer 101 has several different modes of operation shown in FIG. 2. These include AUTO-RECORD mode 201, PLAYBACK mode 202, a UTILITY mode 203, a LOG mode 204, a HELP mode 205, a CARBON COPY mode 206, and an ACKNOWLEDGE mode 207. These modes comprise the different functions of a software package installed onto central computer 101. The software package programs may be stored in the hard disk 113 or on a separate floppy disk that is inserted into an external disk drive (not shown) attached to central computer 101 prior to operation of the captioning system.

The AUTO-RECORD and PLAYBACK modes of operation will now be described in greater detail with reference to FIGS. 1 and 3.

The AUTO-RECORD mode of operation is initiated by a command entered at remote terminal 105 by an operator. For example, mouse 109 attached to keyboard 110 of remote terminal 105 can be used to select the "start auto-record" command option from a menu shown on the operator's display screen 108. This type of command selection from a menu is illustrated in FIG. 4B. The command may also be entered automatically when the system is programmed to function in an automated mode The modem 102 connected to the remote terminal 105 transmits the caption data over standard dial-up telephone line 108 to the modem board 111 of central computer 101. The command initiating this mode includes a file name and other information necessary to identify the caption data in this file.

The command to initiate AUTO-RECORD mode may also be entered directly into the central computer 101 through an optional keyboard 107 and mouse 117 attached to the central computer 101. For example, mouse 117 attached to keyboard 107 of central computer 101 can be used to select the "start auto-record" command option from a menu shown on the operator's display screen 118. This type of command selection is illustrated in FIG. 4B.

Figure 3:
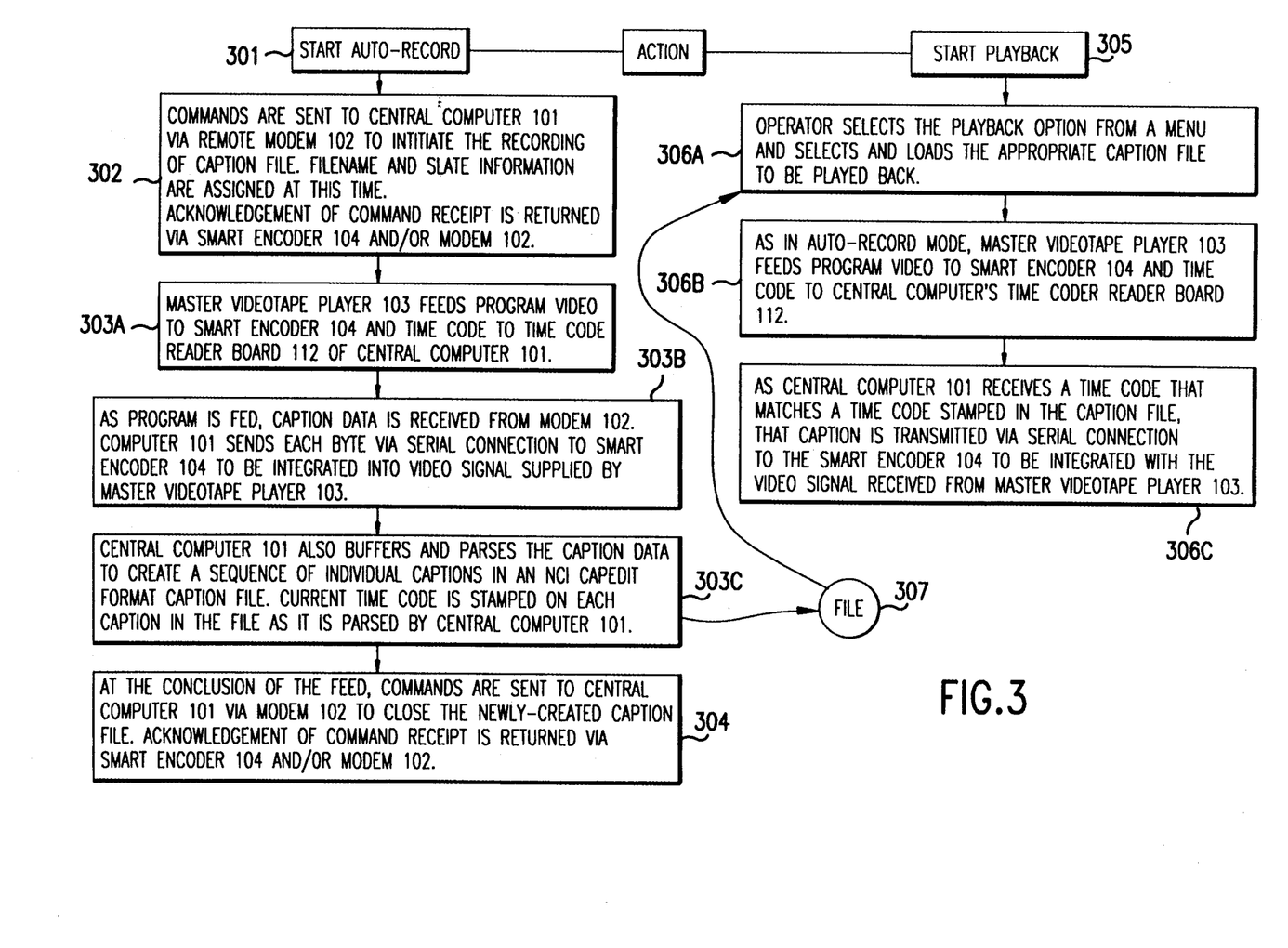
FIG. 3 provides a block diagram of the functions of the central processor in the AUTO-RECORD mode and the PLAYBACK mode.

As illustrated in FIG. 3, upon receipt of the START AUTO-RECORD command shown in box 301, the central processor 114 assigns a file name and slate information provided by the operator to the caption file to be recorded as described in box 302. The central processor 114 then generates an acknowledgement which is transmitted by the modem board 111 via modem 102 to the remote terminal 105. The acknowledgement is also transmitted to the encoder 104 and inserted into the video signal to allow monitoring of the operating status of the central computer 101 when there is not an operator interacting with the system. The acknowledgement generation process is described in box 302 of FIG. 3.

Once transmission of the acknowledgement is completed, the central processor 114 is ready to commence recording of caption data for a live television program.

The operation of the central processor 114 in AUTO-RECORD mode, i.e., during a first feed of a live television program, will now be described with reference to FIGS. 1 and 3. The master videotape player feeds the video signal to the smart encoder 104 and feeds a time code to time code reader board 112 of central computer 101 as described in box 303A. During the feed, caption data for the program is created remotely by a stenographer who types captions into a stenographer's computer 106. The stenographer's computer 106 formats the captions into caption data, for example, in ASCII format, and the modem 102 transmits the caption data from the stenographer's computer 106 to the central computer 101 as described in box 303B. The modem board 111 of the central computer 101 receives the caption data and transmits it to the central processor 114 of central computer 101. The central processor 114 converts the received caption data into a caption signal such that the caption signal may be inserted into the vertical blanking interval of the video signal of the live television program. The central processor 114 then transmits the caption signal to smart encoder 104 via serial connection to be integrated into the vertical blanking interval of the video signal.

As described in box 303C, concurrent with the transmission of the caption signal to the smart encoder 104, the central processor 114 also buffers and parses the caption signal, formats it into individual caption signals, and stores the individual caption signals into data records in the file specified by the initiating command described in box 302. One possible format for the caption signals is NCI CAPEDIT format, but other formats may also be used. The central processor 114 also stores with each data record the time code signal received from master videotape player 103 which corresponds to the time at which the caption data was received by the central computer 101. The time code signal is transmitted by the master videotape player 103 and received by the time code reader board 112 of central computer 101. The data corresponding to the time code signal is referred to as a time code stamp. One time code stamp is stored with each caption data record.

As shown in box 304, once the caption data file for the television program is complete, commands are sent to the central computer 101 from the remote terminal to close the newly-created file. The central processor 114 closes the file and then generates an acknowledgement of this action. The acknowledgement is then transmitted to the remote terminal through the modem 102 and also transmitted to the smart encoder 104 to allow monitoring of the status of operation of the central computer 101 when no operator is interactive with the system.

Finally, the completed caption data file 307 is stored in the hard drive 113 of the central computer 101 to be accessed at a later time.

As shown in box 305, the PLAYBACK mode of operation is initiated by a command entered at remote terminal 105 and transmitted by the modem 102 to central computer 101. The command may be entered manually by an operator, such as by selecting from a menu displayed on display screen 118 of the remote terminal 105 using mouse 109 or keyboard 110. A menu selection screen is shown in FIG. 4B. The command may also be generated by remote terminal 105 automatically when the remote terminal 105 is programmed to function in an automated mode. As shown in box 306A, the command initiating this mode includes the file name corresponding to the caption data the operator wishes to access. In another embodiment of the present invention, this command may also be entered directly into the central computer 101 through a keyboard 107 and/or a mouse 117 attached to the central computer 101.

Upon receipt of the PLAYBACK command, the central processor 114 retrieves and loads the specified file 307 from the hard drive 113 into RAM 115 of central computer 101. The central processor is then ready to commence playback of the file.

The operation of the central processor during PLAYBACK mode (during a second feed of a television program) is as follows. The central processor 114 receives from the time code reader board 112 the time code signal input from master videotape player 103 as described in box 306B. When the central processor 114 receives a time code signal that matches a time code stamp of a data record in the caption data file, the individual caption signal in the data record corresponding to that time code stamp is transmitted via serial connection to the encoder 104 to be inserted into the vertical blanking interval of the video signal transmitted from the master videotape player 103 to the smart encoder 104. This process is described in box 306C.

Finally, once smart encoder 104 has inserted the individual caption signal into the video signal, the smart encoder 104 broadcasts the integrated signal.

The PLAYBACK operation can be repeated as often as repeat broadcasts of the program are desired. In this way, the broadcaster need not repeat the captioning process or make a second generation recording of the original captioned feed to provide repeat feeds of the program including caption information.

The UTILITY mode of operation 203 shown in FIG. 2 is used for file management and log management activities. The following is an example of the types of file management operations that may be included in the system. These operations are also listed in box 208.

COPY—to copy an existing file, for example, onto a floppy disk

DELETE—to delete an existing file

RENAME—to rename an incorrectly named file

VIEW—to view the contents of a caption data file

AUTO-DELETE—to delete all caption files older than a set period of time (for example, to delete all files older than 240 days)

EXIT—to exit the caption program and return to the computer's operating software Typically, an operator may select from a list of functions provided in menu format on a display screen 118 attached to computer 101. For example, an operator could use a mouse 117 to select functions from the "File" menu shown in FIGS. 4A and 4B at the top of the display screen.

In addition to file management functions, the system may be provided with a LOG mode of operation 204 wherein a running log of activity and errors is maintained by the system. This log may be viewed and cleared (reset) by an operator.

A HELP mode of operation 205 may also be provided to allow an operator to access the HELP information system provided in the software package installed on computer 101. For example, the operator of the system may select the HELP mode by selecting the "Help" menu shown in FIGS. 4A and 4B at the top of the display screen.

Further, a CARBON COPY mode of operation 206 may be provided to enable remote system maintenance through third party software.

Additionally, an ACKNOWLEDGEMENT mode of operation 207 may be provided to enable an operator to receive status information regarding the operation of the captioning system. In this mode of operation, the operator can determine the operating status of the captioning system at any time.

Figure 4A:
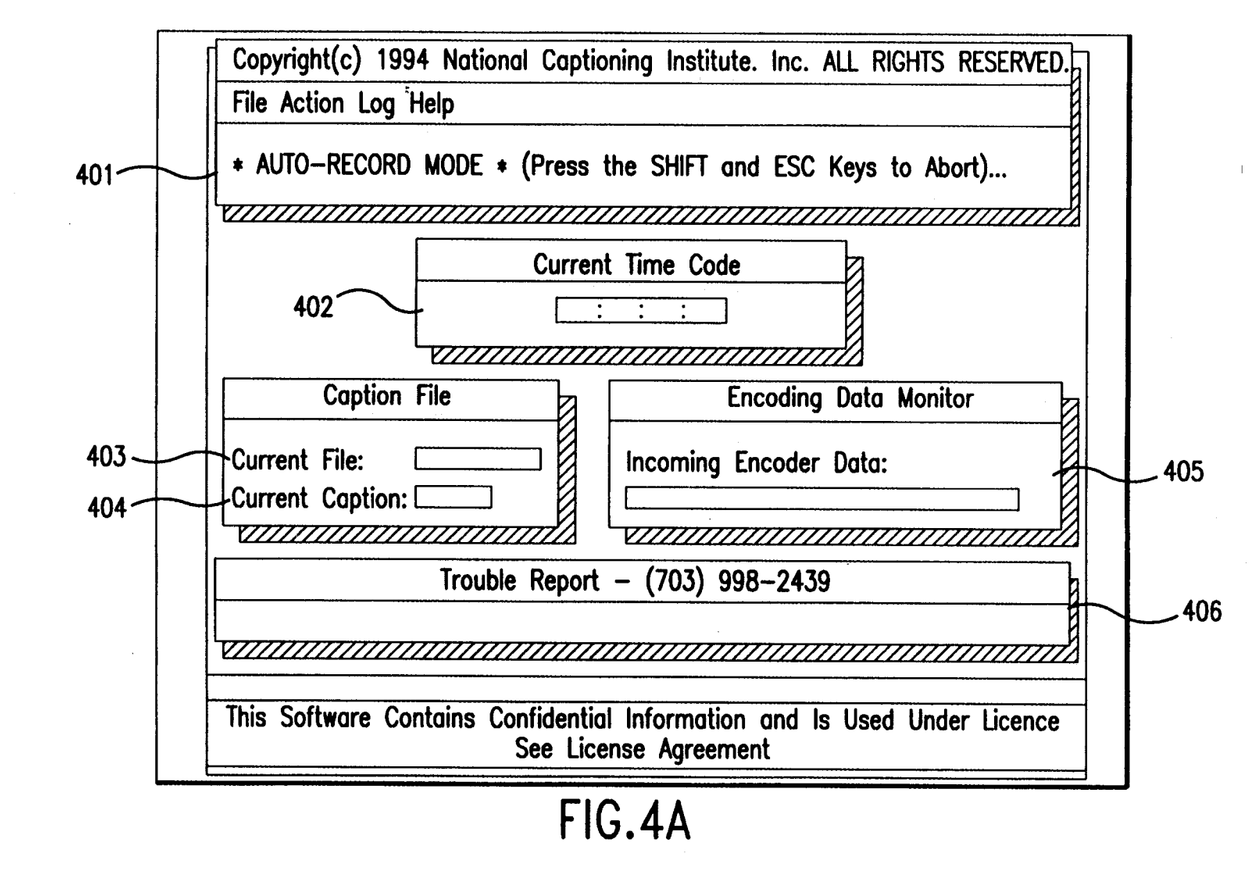
FIG. 4A provides a view of the display screen displaying the status of operation of the central computer in the auto-record mode.
Figure 4B:
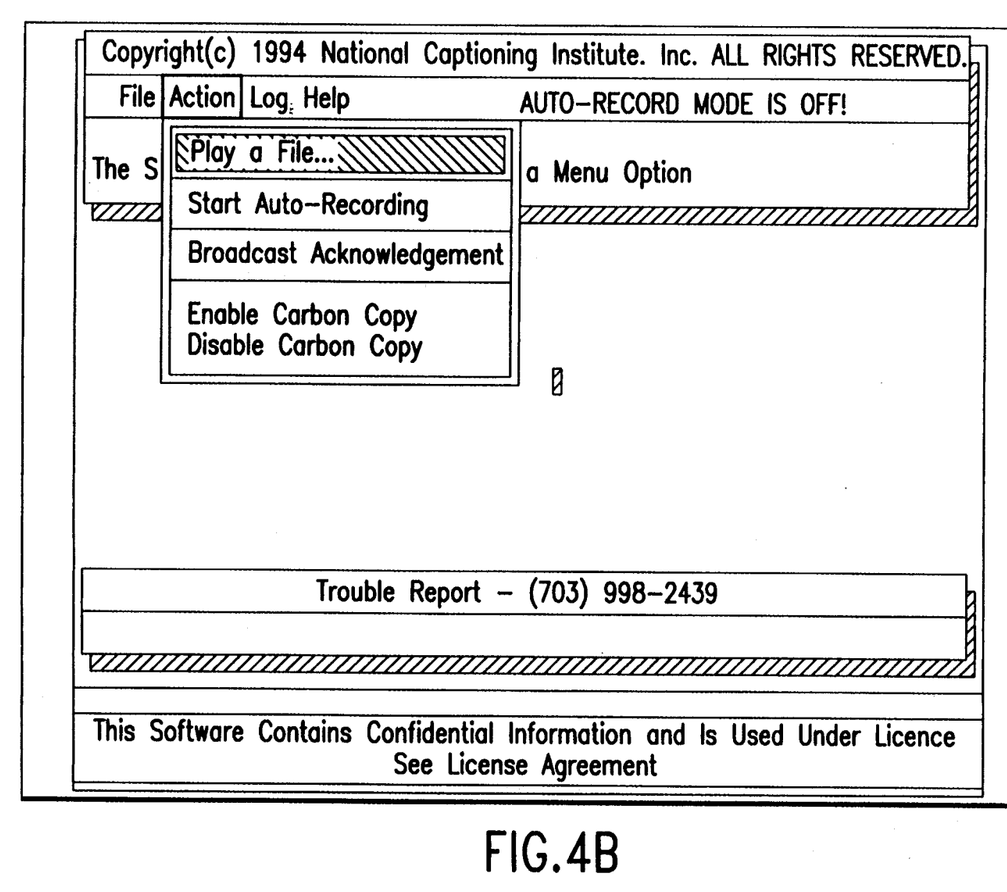
FIG. 4B provides a view of the display screen displaying the action mode of operation of the central computer.

A further component of the central computer 101 is a display screen 118, such as the ones shown in FIGS. 4A and 4B, for monitoring the status of the computer's operations and displaying menus of possible commands to be selected by an operator. For example, FIG. 4A depicts the display during the recording of a caption data file. The screen displays the mode of operation (AUTO-RECORD MODE) 401, the time code input 402 from the master videotape player 103, the title of the caption file being recorded 403, the number of the caption being recorded 404, incoming encoder data 405 (text and encoder data for each caption), and a trouble box 406 to indicate errors in the caption transmission and storage process. The screen display in PLAYBACK mode (not shown) is similar to the display in AUTO-RECORD mode except that the "incoming encoder data" window 405 is replaced by a "character generator" window (not shown) which displays caption text and control data being retrieved and transmitted to the smart encoder 104. FIG. 4B shows one possible screen display providing menus of commands available to an operator.

The smart encoder 104 of the system located at the broadcasting station operates as follows. The smart encoder 104 receives the video signal from the master videotape player 103 and caption signals transmitted from central computer 101. Upon receipt of the video signal and the caption signal, the smart encoder 104 inserts the caption signal into the vertical blanking interval of the video signal. This integrated signal is then broadcasted by the smart encoder 104 to viewers' television sets equipped to display captions.

Similarly, the smart encoder 104 also inserts any acknowledgement signals received from the central computer 101 into the video signal. As a result, passive monitoring of the operation of the captioning system is possible by viewing the captioned program on a television set equipped to display captions (not shown).

The smart encoder 104 does not include a time code reader. It inserts the caption data into the video signal as it is received. Therefore, it is the function of the central processor 114 to coordinate the timing of the caption signals with the video signal from the master videotape player 103.

The system of the present invention described herein can be assembled using an rack-mount 486 computer (central computer 101) and keyboard (107) wherein the computer has been pre-configured with a software package such as NCI's Text Encoding and Display software system. The software package may be permanently stored in the computer or stored on a floppy disk that is inserted into an external disk drive (not shown) attached to the central computer 101. Further, an Adrienne PC-LVTC timecode reader (time code reader board 112) and a Hayes compatible modem (modem board 111) are installed in the computer. The computer includes, for example, a 4 megabyte random access memory and a hard disk of any suitable size for storing caption data or other data depending on the application.

In addition to the keyboard accompanying the rack-mount 486 computer, the computer may also be operated by using an attached mouse, keypad, joystick, light pen, or other data input device.

The computer 101 is coupled to the system components as follows. A standard modular RJ-11 telephone cord (108) is connected from the line outlet to the central computer's modem board 111. The remote Hayes-compatible modem 102 is also connected to a standard modular RJ-11 telephone cord (108) as well as to the stenographer's computer 106 and the remote terminal 105. Data cable is connected between the central computer 101 serial port and the data input of the encoder 104. Cable is also connected between the master videotape player 103 and the time code reader board of the computer.

The smart encoder 104 can be a EEG model EN270 Smart Encoder, and the master videotape player can be an NTSC standard VTR machine that outputs the video signal as well as a time code signal, such as a VITC time code or a longitudinal time code. The master videotape player can also be a machine compatible with any other known video standards. Further, a rack-mount 486 computer can also be used as the remote terminal 105 and coupled to the system via a Hayes-compatible modem 102.

A number of modifications of the above-described system are possible without departing from the scope of the present invention. For example, according to one embodiment of the present invention, during both the original feed and refeeds of the program, an operator inputs the appropriate commands into remote terminal 105 to initiate the desired function of the system. The operator also receives acknowledgements from the central computer 101 on the remote terminal 105 indicating the status of the captioning process, for example, which caption data file is currently being used and whether caption data is being stored to or retrieved from that file.

According to another embodiment of the present invention, the central computer 101 is programmed to store or retrieve data automatically so that it is unnecessary for an operator to initiate storage or retrieval of caption data. In this embodiment, acknowledgement signals indicating the status of the captioning process is transmitted to the encoder and integrated into the video signal along with caption signals. The integrated signal is then transmitted to the individual viewers' television sets. In this way, an operator may monitor the functions of the central computer 101 on a television set equipped to display captions without being interactively connected to the system.

According to yet another embodiment of the present invention, acknowledgement signals indicating the status of the captioning process are transmitted to both the remote terminal 105 and the smart encoder 104 to allow both active and passive monitoring of the captioning system.

While the present invention has been particularly described with reference to the preferred embodiments, it should be readily apparent to those of ordinary skill in the art that changes and modifications in form and details may be made without departing from the spirit and scope of the invention. It is intended that the appended claims include such changes and modifications.

I claim:

1. An apparatus for providing captions for a television signal, the captions comprising a plurality of words for superposition over a video portion of the television signal, the apparatus comprising:

a modem for transmitting caption data over a telephone line, the caption data including one or more captions generated in real time;

a videotape player for playing a videotape, the videotape player having a video output for producing a video signal and a time code output for producing a time code signal corresponding to a time position of the video tape;

a computer coupled to the telephone line over which the modem transmits, and coupled to the time code output of the videotape player, the computer comprising:

means for receiving the caption data transmitted by the modem, means for receiving the time code signal from the videotape player, means for transmitting the received caption data, means for generating data records comprising the received caption data and a time stamp corresponding to the received time code signal, means for storing the generated data records to a disk file, and means for retrieving the data records stored to the disk file, matching the time stamp of each data record in the disk file with the received time code signal, and transmitting the caption data corresponding to the matched time stamp; and an encoder having a video input for receiving the video signal from the videotape player and a caption input for receiving caption data transmitted by the computer, wherein the encoder integrates the received video signal and the received caption data to produce an integrated television signal and transmits the integrated television signal.

2. The apparatus according to claim 1, wherein the computer concurrently transmits the received caption data and creates a disk file of stored data records containing the received caption data with time stamps.

3. The apparatus according to claim 1, further comprising a remote terminal coupled to the modem from which control commands controlling operation of the computer may be provided.

4. The apparatus according to claim 3, wherein the computer further comprises means for generating acknowledgement signals indicating operating status of the computer, and means for transmitting the acknowledgement signals to the remote terminal through the modem.

5. The apparatus according to claim 4, wherein the computer further comprises means for transmitting the acknowledgement signals to the encoder to be integrated into the received video signal.

6. The apparatus according to claim 1, wherein the computer further comprises
means for generating acknowledgement signals indicating operating status of the computer, and
means for transmitting the acknowledgement signals to the encoder to be integrated with the received video signal.

7. The apparatus according to claim 3, wherein the remote terminal comprises a display screen allowing an operator to monitor the operation status of the computer and displaying options available to the operator.

8. In an apparatus for providing captions for a television signal comprising a modem for transmitting caption data over a telephone line, a videotape player for playing a videotape wherein the videotape player has a video output for producing a video signal and a time code output for producing a time code signal corresponding to a time position of the video tape, a computer coupled to the telephone line over which the modem transmits and coupled to the time code output of the videotape player, and an encoder having a video input for receiving the video signal from the videotape player and a caption input for receiving caption data transmitted by the computer, wherein the encoder integrates the received video signal and the received caption data to produce an integrated television signal and transmits the integrated television signal:
means for receiving the caption data transmitted by the modem,
means for receiving the time code signal from the videotape player,
means for transmitting the received caption data,
means for generating data records comprising the received caption data and a time stamp corresponding to the received time code signal,
means for storing the generated data records to a disk file, and
means for retrieving the data records stored to the disk file, matching the time stamp of each data record in the disk file with the received time code signal, and transmitting the caption data corresponding to the matched time stamp.

9. A method of providing captions for a television signal, the captions comprising a plurality of words for superimposition over a video portion of the television signal, the method comprising the steps of:
broadcasting a television program from a master videotape;
generating caption data concurrently with the television program broadcast;
transmitting the generated caption data over a telephone line to a remote computer;
receiving the transmitted caption data at the remote computer;
providing the received caption data to an encoder for integrating the caption data into a video signal from the master videotape and transmitting the integrated signal;
time stamping the received caption data with a time code corresponding to a time position of the master videotape;
storing the time-stamped caption data to a file on the remote computer;
retrieving the stored time-stamped caption data from the file during a subsequent broadcast of the television program;
synchronizing the retrieved time-stamped caption data with time codes read from the master videotape;
providing the synchronized caption data to the encoder for integrating the synchronized caption data into the video signal from the master videotape and transmitting the integrated signal.

* * * * *